(12) United States Patent
Zink et al.

(10) Patent No.: US 9,428,051 B1
(45) Date of Patent: Aug. 30, 2016

(54) DRIVELINE ACTUATOR POWERED BY SYNCHRONIZATION EVENT

(71) Applicant: American Axle & Manufacturing, Inc., Detroit, MI (US)

(72) Inventors: Frederick E. Zink, Capac, MI (US); Charles G. Stuart, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/804,447

(22) Filed: Jul. 21, 2015

(51) Int. Cl.
   *B60K 17/28* (2006.01)
   *B60K 17/16* (2006.01)
(52) U.S. Cl.
   CPC ............. *B60K 17/28* (2013.01); *B60K 17/165* (2013.01)
(58) Field of Classification Search
   CPC .... B60K 17/28; B60K 17/34; B60K 17/165; B60K 17/354
   See application file for complete search history.

(56) References Cited

U.S. PATENT DOCUMENTS

| | | | |
|---|---|---|---|
| 7,410,042 B2 | 8/2008 | Ochab et al. | |
| 7,878,933 B2 | 2/2011 | Porter et al. | |
| 8,047,323 B2 | 11/2011 | Downs et al. | |
| 2010/0038164 A1* | 2/2010 | Downs | B60K 17/348 180/248 |
| 2010/0044138 A1* | 2/2010 | Marsh | B60K 17/348 180/247 |
| 2013/0303326 A1* | 11/2013 | Downs | F16H 48/22 475/221 |
| 2013/0310209 A1* | 11/2013 | Downs | B60K 23/08 475/221 |

FOREIGN PATENT DOCUMENTS

EP    1762754 A2    3/2007

\* cited by examiner

*Primary Examiner* — Huan Le
(74) *Attorney, Agent, or Firm* — Harness, Dickey & Pierce, P.L.C.

(57) ABSTRACT

A disconnectable all-wheel drive vehicle driveline having a primary driveline, a power take-off unit (PTU), a secondary driveline, a hydraulic pump and a driveline actuator. The PTU has a PTU input member, which is driven by the primary driveline, a PTU output member and a first coupling that selectively couples the PTU input and output members. The secondary driveline includes a second coupling that selectively inhibits power transmission through the secondary driveline. The hydraulic pump is configured to operate the first coupling but is powered by a synchronization event in which the second coupling is engaged so as to back drive the PTU output member.

10 Claims, 3 Drawing Sheets

DRIVELINE ACTUATOR POWERED BY SYNCHRONIZATION EVENT

FIELD

The present disclosure relates to a disconnectable all-wheel drive vehicle driveline having a primary driveline, a secondary driveline, a torque transmitting device and a driveline actuator that is powered by a synchronization event to cause the torque transmitting device to transmit rotary power from the primary driveline to the secondary driveline.

BACKGROUND

This section provides background information related to the present disclosure which is not necessarily prior art.

U.S. Pat. No. 8,047,323 discloses a disconnecting all-wheel drive drivetrain having a primary driveline, which is operated on a full-time basis, and a secondary driveline that is operated on an as-needed basis so as to maximize fuel economy. More specifically, the '323 patent discloses a configuration in which a power take-off unit (PTU) has a PTU input member, which is driven by the primary driveline, a PTU output member, and a synchronizer having a collar that is selectively movable via an actuator to control transmission of rotary power through the PTU. The actuator in the PTU is described as being electrically, mechanically, hydraulically and/or pneumatically operated.

SUMMARY

This section provides a general summary of the disclosure, and is not a comprehensive disclosure of its full scope or all of its features.

In one form, the present teachings provide a vehicle drivetrain that includes a primary driveline, a power take-off unit (PTU), a secondary driveline, an actuator and a hydraulic pump. The primary driveline has a first driveline input member, a first differential assembly and a pair of first driveline output members. The first driveline input member is configured to receive rotary power directly from a vehicle powertrain. The first differential assembly is driven on a full-time basis by the first driveline input member and transmits rotary power to the first and second driveline output members. The PTU has a PTU input member, a PTU output member and a first coupling. The PTU input member is driven by the first driveline input member. The first coupling has an axially slidable coupling member that is movable between a first position and a second position. When the coupling member is in the first position, the first coupling is operable in a first coupling mode in which the PTU output member is decoupled from the PTU input member to inhibit transmission of rotary power therebetween. When the coupling member is in the second position, the first coupling is operable in a second coupling mode in which the PTU input member and the PTU output member are drivingly coupled to one another. The secondary driveline has a second driveline input member, a second differential assembly, a pair of second driveline output members and a second coupling. The second driveline input member is coupled for rotation with the PTU output member. The second coupling is a multi-plate friction coupling that is operable in a third coupling mode, in which the second input member is decoupled from at least one of the pair of second driveline output members to inhibit transmission of rotary power therebetween, and a fourth coupling mode in which the second driveline input member and the pair of second driveline output members are drivingly coupled to one another through the second differential assembly. The actuator is coupled to the PTU and has a hydraulic cylinder and an actuator output member that is driven by the hydraulic cylinder and engaged to the coupling member. The actuator output member is movable to cause corresponding movement of the coupling member between the first and second positions. The hydraulic pump has a pump stator and a pump rotor that is rotatable relative to the pump stator and coupled for rotation with the PTU output member.

In another form, the present teachings provide a method for operating a vehicle driveline having a primary driveline, a power take-off unit (PTU) and a secondary driveline. The primary driveline has a first driveline input member that is drivingly coupled to a pair of first driveline output members. The PTU has a PTU input member, which is driven by the first driveline input member, a PTU output member and a first coupling. The secondary driveline has a second driveline input member, a pair of driveline output members and a second coupling. The method includes: operating the vehicle driveline in a two-wheel drive mode in which rotary power is not transmitted through the first and second couplings; operating the second coupling when the vehicle driveline is operating in the two-wheel drive mode to back drive the PTU output member and to provide rotary power to a hydraulic pump; and transmitting pressurized hydraulic fluid from the hydraulic pump to a hydraulic actuator to operate the first coupling in a mode in which rotary power is transmitted between the PTU input member and the PTU output member to thereby cause the vehicle driveline to be operated in an all-wheel drive mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
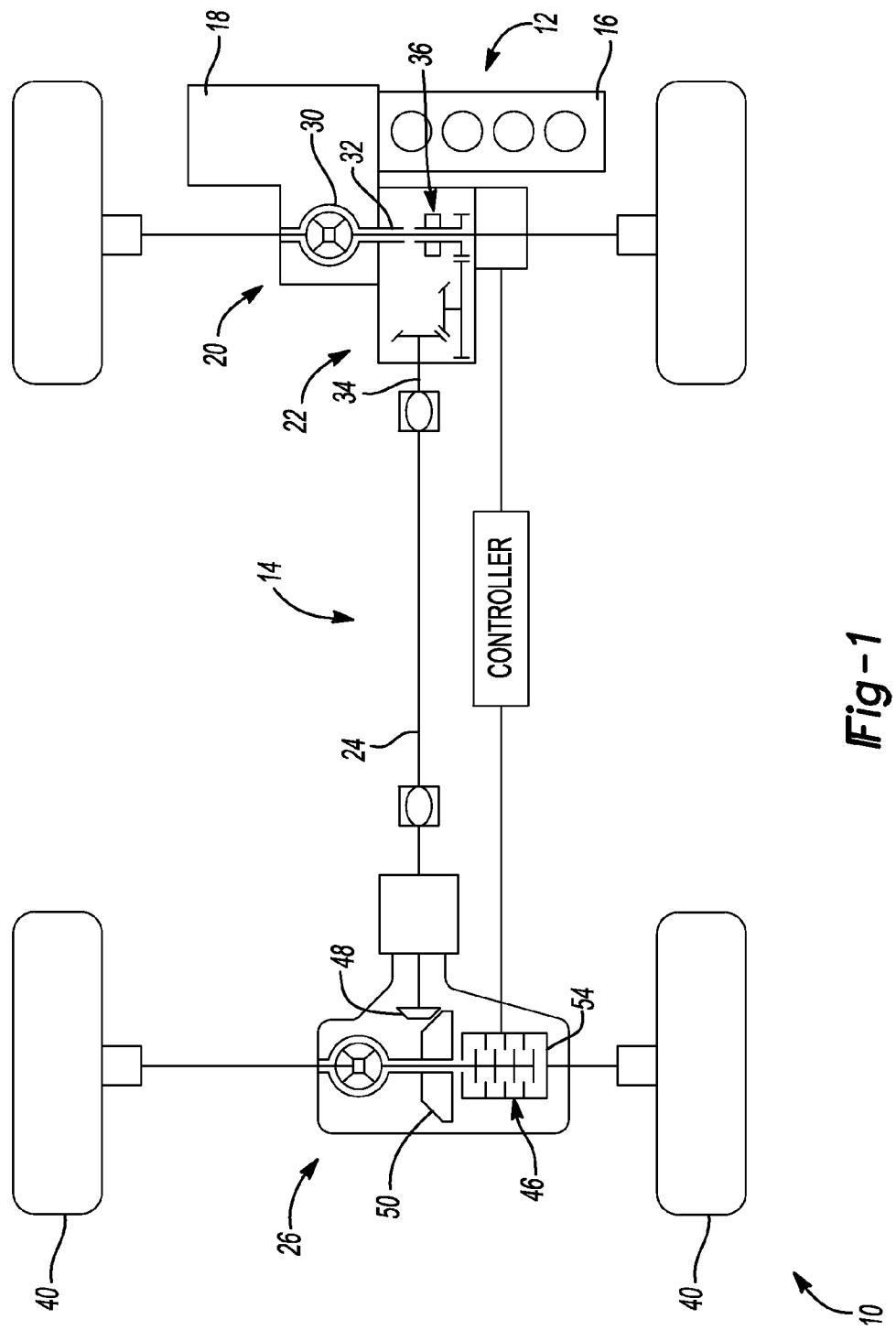
FIG. 1 is a schematic illustration of an exemplary vehicle having a drivetrain that is constructed in accordance with the teachings of the present disclosure.

With reference to FIG. 1 of the drawings, an exemplary vehicle 10 is illustrated to have a power train 12 and a drivetrain 14 that constructed in accordance with the teachings of the present disclosure. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drivetrain 14. The transmission 18 can have a plurality of automatically or manually-selected gear ratios. The drivetrain 14 in the particular example provided is of a disconnectable all-wheel drive configuration in which the front vehicle wheels are driven on a full-time basis and the rear vehicle wheels are selectively driven on an on-demand basis.

The drivetrain 14 can include a primary driveline (e.g., a front axle assembly 20 in the example provided), a power take-off unit (PTU) 22, a prop shaft 24 and a secondary driveline (e.g., a rear axle assembly 26 in the example provided). An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, a PTU output member 34 that can transmit rotary power to the prop shaft 24, and a first or PTU coupling 36 that can be configured to selectively interrupt power transmission between the PTU input member 32 and the PTU output member 34. An exemplary configuration of the PTU 22 is disclosed in U.S. Pat. No. 8,047,323, but it will be appreciated that other configurations could be employed for the PTU 22, including without limitation those disclosed in U.S. Pat. Nos. 8,469,854; 8,795,126; 8,961,353; and 8,986,148.

The prop shaft 24 can couple the PTU output member 34 to the rear axle assembly 26 such that rotary power output by the PTU 22 is received by the rear axle assembly 26 to drive a pair of rear vehicle wheels 40. The rear axle assembly 26 can include a second coupling 46 that can be configured to selectively interrupt power transmission between the prop shaft 24 and at least one of the rear vehicle wheels 40. An exemplary configuration of the rear axle assembly 26 is shown in U.S. Pat. No. 8,047,323, but it will be appreciated that other configurations could be employed for the rear axle assembly 26, including without limitation those disclosed in U.S. Pat. Nos. 8,469,854; 8,795,126; 8,961,353; and 8,986,148; and 9,028,358. The first and second couplings 36 and 46 can be employed to halt power transmission through the PTU 22, the prop shaft 24 and portions of the rear axle assembly 26, such as an input pinion 48 and a ring gear 50, so that the vehicle drivetrain 14 operates in a front-wheel drive mode.

The second coupling 46 can be a multi-plate friction clutch, the engagement of which can be controlled in a ramped or staggered manner so as to permit portions of the vehicle driveline 14 between the first and second couplings 36 and 46 to be ramped up in speed when the driveline 14 is to be switched from the front-wheel drive mode to an all-wheel drive mode. As is known in the art, one or more of the rear vehicle wheels 40 can provide rotary power to an output section 54 of the second coupling 46, which can be employed to drive the portions of the rear axle assembly 26 (e.g., the ring gear 50 and the input pinion 48), the prop shaft 24 and the portion of the PTU 22 between the first coupling 36 and the PTU output member 34. Accordingly, the second coupling 46 can be selectively operated to accelerate elements or components of the vehicle drivetrain 14 between the first and second couplings 36 and 46 so that their rotary speeds are matched (i.e., synchronized) in a corresponding manner to the rotational speeds of these components if the vehicle drivetrain 14 were to be operating in the all-wheel drive mode.

Figure 2:
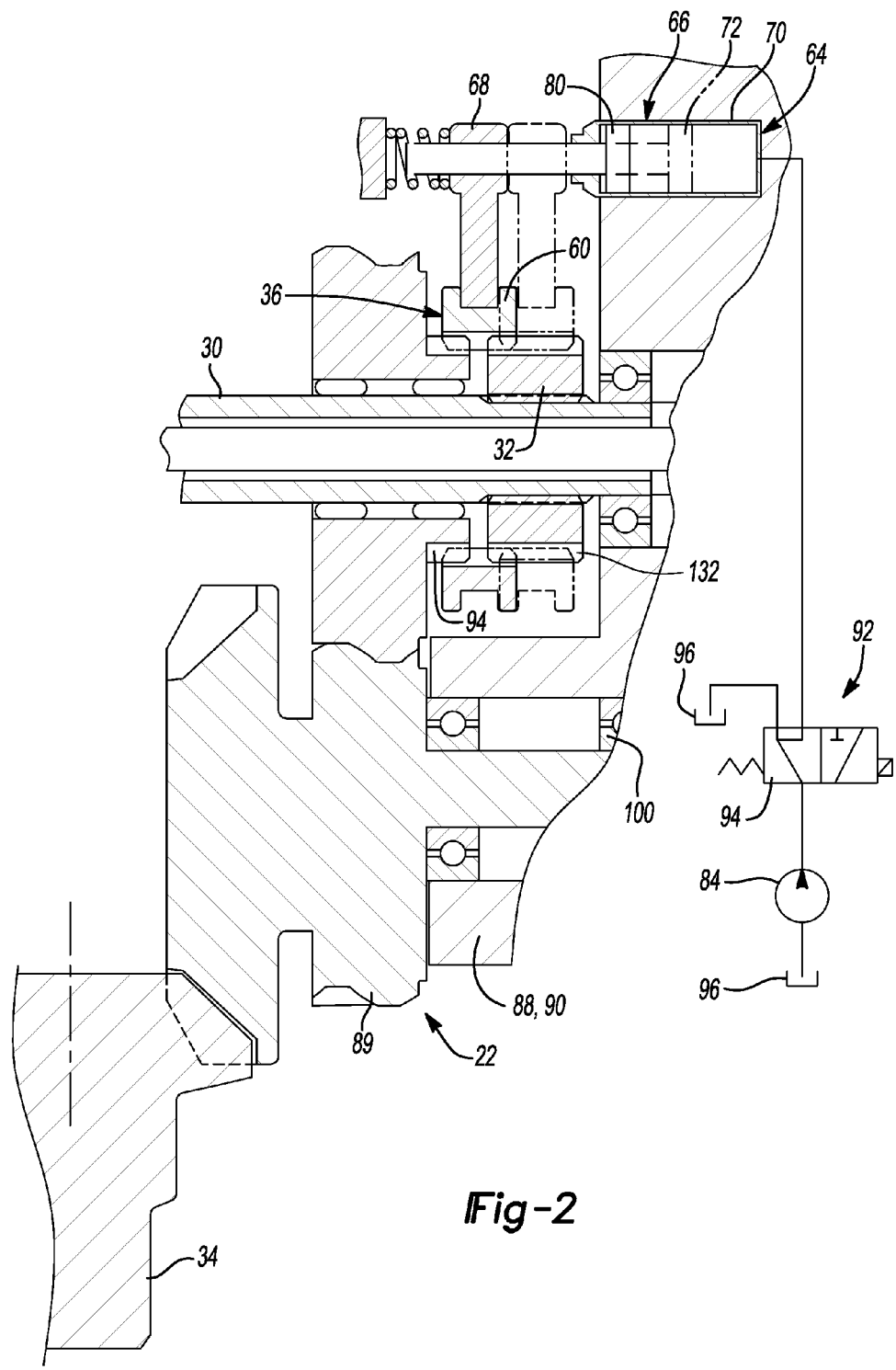
FIG. 2 is a sectional view of a portion of the drivetrain that is illustrated in FIG. 1, the view depicting a portion of a power take-off unit and schematically illustrating a hydraulic system that is configured to operate a first coupling.

With additional reference to FIG. 2, the first coupling 36 can be operated to permit rotary power to be transmitted from the PTU input member 32 to the PTU output member 34 once the portion of the vehicle driveline 14 between the first and second couplings 36 and 46 has been accelerated so that its speed is synchronized for engagement of the first coupling 36. The first coupling 36 can comprise a clutch, a synchronizer, a sliding collar or can be configured as a dog clutch so as to have an axially movable coupling member 60 that can be moved via a hydraulic actuator 64 between a first position, in which the transmission of rotary power between the PTU input member 32 and the PTU output member 34 is interrupted, and a second position in which the transmission of rotary power between the PTU input member 32 and the PTU output member 34 is enabled. The hydraulic actuator 64 can include a cylinder assembly 66 and an actuator output member 68. The cylinder assembly 66 can include a cylinder structure 70 and a piston 72 that can be slidably received in the cylinder structure 70. The actuator output member 68 can be configured to transmit motion of the piston 72 to the axially movable coupling member 60. In the particular example provided, the hydraulic actuator 64 is constructed in a manner that is described in co-pending International Patent Application Serial No. PCT/US2015/016111 entitled "Actuator For A Driveline Component", the disclosure of which is incorporated by reference as if fully set forth in detail herein. Briefly, the hydraulic actuator 64 is configured with a latching mechanism 80 that permits the piston 72 to be locked in an extended or retracted position in response to a predetermined drop in hydraulic pressure acting on the piston 72 so that it is not necessary to constantly apply hydraulic pressure to the hydraulic actuator 64.

Figure 3:
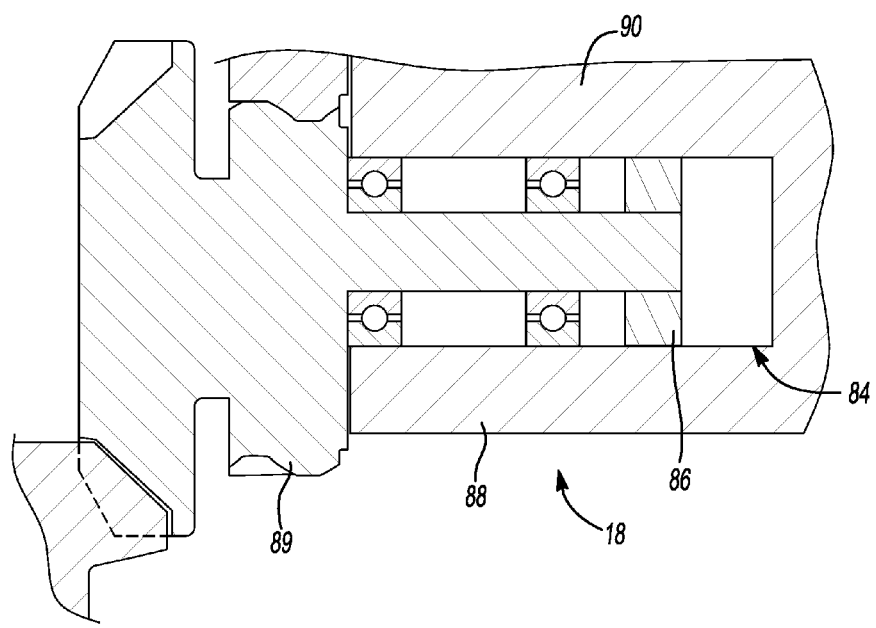
FIG. 3 is a section view depicting a part of the hydraulic system.

A hydraulic pump 84 can be driven by a portion of the drivetrain 14 that is rotatable when the drivetrain 14 is operated in an all-wheel drive mode (in which rotary power is transmitted from the PTU 22 to the rear axle assembly 26) but which halts rotation when the drivetrain 14 is operated in a front-wheel drive mode (in which rotary power is not transmitted between the PTU 22 and the rear axle assembly 26). The hydraulic pump 84 can have a rotor 86 (FIG. 3) and a pump stator or housing 88 (FIG. 3) that can be fixedly mounted to a non-rotating portion of the vehicle drivetrain 14, such as a housing of the PTU 22 or the rear axle assembly 26. The rotor 86 (FIG. 3) can be coupled for rotation with any rotatable element between an output of the first coupling 36 and an output of the second coupling 46, such as the PTU output member 34, the prop shaft 24 or the input pinion 48. In the particular example provided, the rotor 86 (FIG. 3) is driven by an intermediate gear 89 that is disposed in a power transmission path between the PTU input member 32 and the PTU output member 34.

During operation of the drivetrain 14 in a front-wheel drive mode, the first and second couplings 36 and 46 are operated so that rotary power is not transmitted between the PTU 22 and the rear axle assembly 26 and as such, the PTU output member 34 does not rotate relative to the housing 90 of the PTU 22. Consequently, the rotor 86 (FIG. 3) does not rotate relative to the pump stator 88 when the drivetrain 14 is operated in the front-wheel drive mode so that the hydraulic pump 84 is not capable of producing pressurized hydraulic fluid to operate the hydraulic actuator 64.

The second coupling 46 can be engaged to initiate the process for transitioning the drivetrain 14 from the front-wheel drive mode to the all-wheel drive mode. As described above, the second coupling 46 can be operated in a desired manner to rotationally accelerate the elements/components of the drivetrain 14 between the first and second couplings 36 and 46 that do not rotate when the drivetrain 14 is operated in the front-wheel drive mode. It will be appreciated that rotational acceleration of this portion of the drivetrain 14 will cause rotation of the PTU output member 34 relative to the housing 88 of the PTU 22, and as such, rotation of the rotor 86 (FIG. 3) relative to the pump stator 88 so that the hydraulic pump 84 can operate to provide pressurized hydraulic fluid.

A control valve 92 can be employed to selectively couple the hydraulic pump 84 to the hydraulic actuator 64. In the example provided, the control valve 92 is an electric solenoid-controlled two-position, three-way directional valve having a valve element 94 that is movable between a first position, in which the control valve 92 couples the output of the hydraulic pump 84 in fluid connection to a hydraulic reservoir 96 that provides a source of hydraulic fluid to the input of the hydraulic pump 84, and a second position in which the control valve 92 couples the output of the hydraulic pump 84 in fluid connection to the hydraulic actuator 64. Accordingly, it will be appreciated that after the second coupling 46 has been operated to cause transmission of rotary power to the PTU output member 34 (and the rotor 86 of the hydraulic pump 84), the control valve 92 can be operated briefly to permit sufficient pressurized hydraulic fluid to be transmitted to the hydraulic actuator 64 to cause the movement of the piston 72 and the actuator output member 68 that engages the first coupling 36. Due to the presence of the latching mechanism 80 in the hydraulic actuator 64, the valve element 94 of the control valve 92 can thereafter be moved (e.g., via a return spring 100 not shown) so that hydraulic fluid exiting the hydraulic pump 84 is returned directly to the hydraulic reservoir 96. It will be appreciated, however, that the hydraulic actuator 64 need not have a latching mechanism and that in such situation, the valve element 94 could be maintained (e.g., electronically via the electric solenoid) in the second position to permit the hydraulic pump 84 to output pressurized hydraulic fluid to the hydraulic actuator 64 to selectively change the operational mode of the drivetrain 14 between the front-wheel drive mode and the all-wheel drive mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle drivetrain comprising:
   a primary driveline having a first driveline input member, a first differential assembly and a pair of first driveline output members, the first driveline input member being adapted to receive rotary power directly from a vehicle powertrain, the first differential assembly being driven on a full-time basis by the first driveline input member and transmitting rotary power to the first and second driveline output members;
   a power take-off unit (PTU) having a PTU input member, a PTU output member and a first coupling, the PTU input member being driven by the first driveline input member, the first coupling having an axially slidable coupling member that is movable between a first position and a second position, wherein when the coupling member is in the first position, the first coupling is operable in a first coupling mode in which the PTU output member is decoupled from the PTU input member to inhibit transmission of rotary power therebetween, and wherein when the coupling member is in the second position, the first coupling is operable in a second coupling mode in which the PTU input member and the PTU output member are drivingly coupled to one another;
   a secondary driveline having a second driveline input member, a second differential assembly, a pair of second driveline output members and a second coupling, the second driveline input member being coupled for rotation with the PTU output member, the second coupling being a multi-plate friction clutch that is operable in a third coupling mode, in which the second input member is decoupled from at least one of the pair of second driveline output members to inhibit transmission of rotary power therebetween, and a fourth coupling mode in which the second driveline input member and the pair of second driveline output members are drivingly coupled to one another through the second differential assembly;
   an actuator coupled to the PTU, the actuator having a hydraulic cylinder and an actuator output member that is driven by the hydraulic cylinder and engaged to the coupling member, the actuator output member being movable to cause corresponding movement of the coupling member between the first and second positions; and
   a hydraulic pump having a pump stator and a pump rotor, the pump rotor being rotatable relative to the pump stator and being coupled for rotation with the PTU output member.

2. The vehicle driveline of claim 1, wherein the pump stator is mounted to a housing of the PTU.

3. The vehicle driveline of claim 1, wherein the actuator is configured to latch the actuator output member to maintain the coupling member in at least one of the first and second positions.

4. The vehicle driveline of claim 3, wherein the actuator is configured to latch the actuator output member to maintain the coupling member in both of the first and second positions in response to a drop in hydraulic pressure that is applied to the hydraulic cylinder.

5. The vehicle driveline of claim 4, further comprising a two-position, three-way valve coupled to the hydraulic pump, the hydraulic cylinder and a hydraulic fluid reservoir.

6. The vehicle driveline of claim 5, two-position, three-way valve has a valve element that is movable between a first valve element position, in which the hydraulic pump is coupled in fluid communication to the hydraulic fluid reservoir and the hydraulic cylinder is coupled in fluid communication to the hydraulic fluid reservoir, and a second valve element position in which the hydraulic pump is coupled in fluid communication to the hydraulic cylinder.

7. The vehicle driveline of claim 6, wherein the two-position, three-way valve is a solenoid controlled valve.

8. A method for operating a vehicle driveline having a primary driveline, a power take-off unit (PTU) and a secondary driveline, the primary driveline having a first driveline input member that is drivingly coupled to a pair of first driveline output members, the PTU having a PTU input member, which is driven by the first driveline input member, a PTU output member and a first coupling, the secondary driveline having a second driveline input member, a pair of driveline output members and a second coupling, the method comprising:

operating the vehicle driveline in a two-wheel drive mode in which rotary power is not transmitted through the first and second couplings;

operating the second coupling when the vehicle driveline is operating in the two-wheel drive mode to back drive the PTU output member and to provide rotary power to a hydraulic pump; and transmitting pressurized hydraulic fluid from the hydraulic pump to a hydraulic actuator to operate the first coupling in a mode in which rotary power is transmitted between the PTU input member and the PTU output member to thereby cause the vehicle driveline to be operated in an all-wheel drive mode.

9. The method of claim 8, wherein prior to transmitting pressurized hydraulic fluid from the hydraulic pump to the hydraulic actuator, the method comprises operating a valve to couple the hydraulic pump in fluid communication with the hydraulic actuator.

10. The method of claim 9, wherein after transmitting pressurized fluid from the hydraulic pump to the hydraulic actuator, the method further comprises:

latching the hydraulic actuator to maintain a movable coupling member of the first coupling in a desired position; and coupling an output of the hydraulic pump in fluid communication a hydraulic reservoir.

* * * * *